US012698822B2

(12) United States Patent
Oguchi

(10) Patent No.: US 12,698,822 B2
(45) Date of Patent: Aug. 4, 2026

(54) POWER TRANSMISSION DEVICE, MEDIUM TRANSPORT DEVICE, AND RECORDING DEVICE

(71) Applicant: SEIKO EPSON CORPORATION, Tokyo (JP)

(72) Inventor: Takeru Oguchi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 19/257,784

(22) Filed: Jul. 2, 2025

(65) Prior Publication Data

US 2026/0009451 A1 Jan. 8, 2026

(30) Foreign Application Priority Data

Jul. 5, 2024 (JP) ................................. 2024-108726

(51) Int. Cl.
*F16H 7/14* (2006.01)
*B41J 13/03* (2006.01)
(Continued)

(52) U.S. Cl.
CPC ............... *F16H 7/14* (2013.01); *B41J 13/03* (2013.01); *B41J 13/32* (2013.01); *B65H 3/0669* (2013.01); *B65H 5/062* (2013.01); *F16H 7/02* (2013.01); *B65H 2403/20* (2013.01); *B65H 2403/25* (2013.01); *B65H 2403/944* (2013.01);
(Continued)

(58) Field of Classification Search
CPC .. B65H 5/062; B65H 3/0669; B65H 2403/20; B65H 2403/21; B65H 2403/25; B65H 2403/944; B65H 2007/0806; B65H 2007/0865; B65H 2007/0891; B65H 2007/0895; B65H 2007/0808; F16H 7/14; F16H 7/10; F16H 7/12; F16H 7/02
See application file for complete search history.

(56) References Cited

U.S. PATENT DOCUMENTS

2001/0054787 A1* 12/2001 Yamagishi ............. B65H 5/062
271/3.17
2005/0113197 A1* 5/2005 Pong ........................ F16H 7/14
474/133
(Continued)

FOREIGN PATENT DOCUMENTS

JP H09-239440 A 9/1997
JP 2011-219222 A 11/2011
WO WO-2021183245 A1 * 9/2021 ........... B65H 3/0669

*Primary Examiner* — Luis A Gonzalez
(74) *Attorney, Agent, or Firm* — WORKMAN NYDEGGER

(57) ABSTRACT

A power transmission device includes a first pulley driven by a first drive source; a second pulley driven by a second drive source; a first power transmission belt that is wound around the first pulley and an object to be driven and that transmits power from the first pulley to the object to be driven; a second power transmission belt that is wound around the second pulley and the object to be driven and that transmits power from the second pulley to the object to be driven; a first tension applying section that applies tension to the first power transmission belt; a second tension applying section that applies tension to the second power transmission belt; and a load applying section that applies a load to the first tension applying section and applies a load to the second tension applying section.

15 Claims, 8 Drawing Sheets

(51) Int. Cl.

| | |
|---|---|
| *B41J 13/32* | (2006.01) |
| *B65H 3/06* | (2006.01) |
| *B65H 5/06* | (2006.01) |
| *B65H 29/12* | (2006.01) |
| *F16H 7/02* | (2006.01) |
| *F16H 7/08* | (2006.01) |
| *F16H 7/10* | (2006.01) |

(52) U.S. Cl.

CPC ................ *F16H 2007/0806* (2013.01); *F16H 2007/0865* (2013.01); *F16H 2007/0891* (2013.01); *F16H 2007/0895* (2013.01)

(56) References Cited

U.S. PATENT DOCUMENTS

| | | | |
|---|---|---|---|
| 2017/0370448 A1* | 12/2017 | Hansen ..................... | F16H 7/12 |
| 2021/0239195 A1* | 8/2021 | Chen ......................... | F16H 7/14 |

\* cited by examiner

POWER TRANSMISSION DEVICE, MEDIUM TRANSPORT DEVICE, AND RECORDING DEVICE

The present application is based on, and claims priority from JP Application Serial Number 2024-108726, filed Jul. 5, 2024, the disclosure of which is hereby incorporated by reference herein in its entirety.

BACKGROUND

1. Technical Field

The present disclosure relates to a power transmission device that transmits power and a medium transport device including the power transmission device. The present disclosure also relates to a recording device including the medium transport device.

2. Related Art

JP-A-2011-219222 discloses a configuration in which a winding shaft for winding roll paper is rotated by a plurality of torque motors. Power is transmitted from each torque motor to a winding shaft, which is an object to be driven, by a power transmission belt.

When an object to be driven is driven by a belt, a tensioner is generally provided to apply a predetermined tension to the belt. However, in a configuration in which one object to be driven is driven by a plurality of belts as in the configuration described in JP-A-2011-219222, there is a possibility that tension varies and a load varies among a plurality of motors.

SUMMARY

In order to overcome the above-described problem, a power transmission device according to the present disclosure includes a first pulley driven by a first drive source; a second pulley driven by a second drive source; a first power transmission belt that is wound around the first pulley and an object to be driven and that transmits power from the first pulley to the object to be driven; a second power transmission belt that is wound around the second pulley and the object to be driven and that transmits power from the second pulley to the object to be driven; a first tension applying section that applies tension to the first power transmission belt; a second tension applying section that applies tension to the second power transmission belt; and a load applying section that applies a load to the first tension applying section and applies a load to the second tension applying section.

A medium transport device according to the present disclosure includes the power transmission device; the first drive source; the second drive source; and a transport section that transports a medium by power transmitted via the object to be driven.

A recording device according to the present disclosure includes the medium transport device and a recording section that performs recording on a medium transported by the medium transport device.

DESCRIPTION OF EMBODIMENTS

Figure 1:
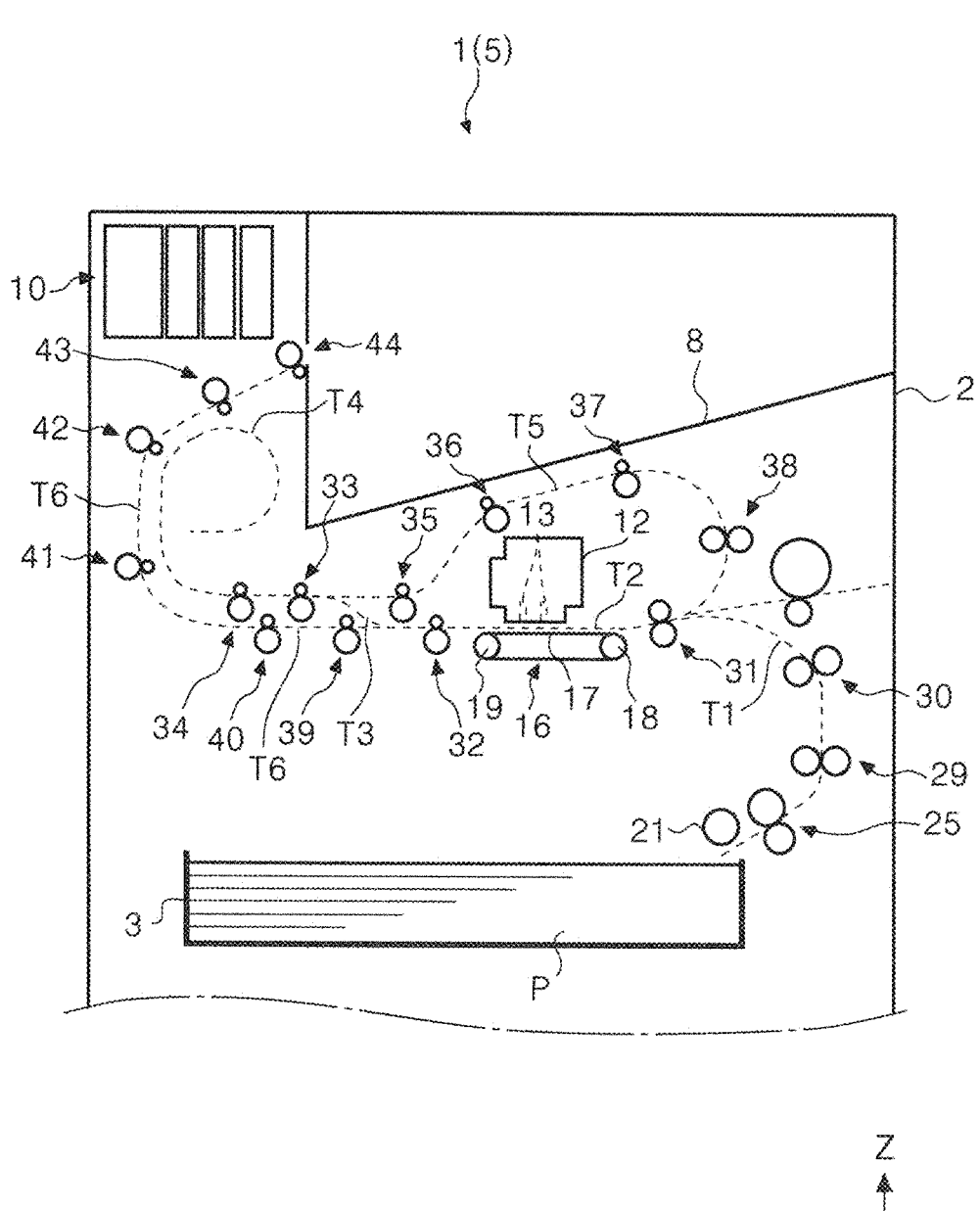
FIG. 1 is a diagram showing an entire transport path of a medium in a printer.

Hereinafter, the present disclosure will be schematically described.

A power transmission device according to a first aspect includes a first pulley driven by a first drive source; a second pulley driven by a second drive source; a first power transmission belt that is wound around the first pulley and an object to be driven and that transmits power from the first pulley to the object to be driven; a second power transmission belt that is wound around the second pulley and the object to be driven and that transmits power from the second pulley to the object to be driven; a first tension applying section that applies tension to the first power transmission belt; a second tension applying section that applies tension to the second power transmission belt; and a load applying section that applies a load to the first tension applying section and applies a load to the second tension applying section.

According to the present aspect, since a load is applied to both the first tension applying section and the second tension applying section by one load applying section, a load applied to the first tension applying section and a load applied to the second tension applying section are equal to each other in most cases, or a difference therebetween is small even when the difference occurs. As a result, a difference between tension of the first power transmission belt and tension of the second power transmission belt can be suppressed.

A second aspect is an aspect according to the first aspect, and the load applying section is a spring member including one end that applies a load to the first tension applying section and an other end that applies a load to the second tension applying section.

According to the present aspect, in a configuration in which the load applying section is the spring member of which one end applies a load to the first tension applying section and the other end applies a load to the second tension applying section, the operation and effect of the first aspect described above are obtained.

A third aspect is an aspect according to the second aspect, and the spring member is a coil spring and the first tension applying section and the second tension applying section are configured to be displaced along a load applying direction of the coil spring.

According to the present aspect, since the first tension applying section and the second tension applying section are configured to be displaced along the load applying direction of the coil spring, it is possible to adopt a configuration in which the spring force of the coil spring easily acts on the first tension applying section and the second tension applying section.

A fourth aspect is an aspect according to the second aspect, and the spring member is a torsion spring including a first arm section that applies a load to the first tension applying section and a second arm section that applies a load to the second tension applying section, a first direction in which the first arm section applies a load to the first tension applying section is different from a second direction in which the second arm section applies a load to the second tension applying section, the first tension applying section is configured to be displaced along the first direction, and the second tension applying section is configured to be displaced along the second direction.

According to the present aspect, since the first tension applying section is configured to be displaced along the first direction and the second tension applying section is configured to be displaced along the second direction, it is possible to adopt a configuration in which the spring force of the torsion spring easily acts on the first tension applying section and the second tension applying section.

A fifth aspect is an aspect according to the third aspect, and a first direction in which the one end applies a load to the first tension applying section and a second direction in which the other end applies a load to the second tension applying section intersect with each other.

According to the present aspect, since the first direction and the second direction intersect with each other, the first pulley and the second pulley can be brought close to each other. As a result, the device dimension in a direction along the inter-axis distance of the first pulley and the second pulley can be suppressed.

A sixth aspect is an aspect according to the fourth aspect, and the first direction and the second direction intersect with each other.

According to the present aspect, since the first direction and the second direction intersect with each other, the first pulley and the second pulley can be brought close to each other. As a result, the device dimension in a direction along the inter-axis distance of the first pulley and the second pulley can be suppressed.

A seventh aspect is an aspect according to the first aspect, and the first tension applying section holds a rotation shaft of the first pulley.

According to the present aspect, since the first tension applying section holds the rotation shaft of the first pulley, a load of the load applying section is easily applied to the first power transmission belt.

The present aspect is not limited to the first aspect and may be according to any one of the second to sixth aspects.

An eighth aspect is an aspect according to the seventh aspect, and the second tension applying section holds a rotation shaft of the second pulley.

According to the present aspect, since the second tension applying section holds the rotation shaft of the second pulley, a load of the load applying section is easily applied to the second power transmission belt.

The present aspect is not limited to the fifth aspect and may be according to any one of the first to sixth aspects.

A ninth aspect is an aspect according to the eighth aspect, and the first tension applying section includes a first gear that transmits power to the first pulley and the first tension applying section is configured to swing around a first rotation shaft that is a rotation shaft of the first gear, the second tension applying section includes a second gear that transmits power to the second pulley and the second tension applying section is configured to swing around a second rotation shaft that is a rotation shaft of the second gear, the first rotation shaft is positioned between a rotation center of the first pulley and a first position at which the load applying section applies a load to the first tension applying section, and the second rotation shaft is positioned between a rotation center of the second pulley and a second position at which the load applying section applies a load to the second tension applying section.

According to the present aspect, since the first rotation shaft is positioned between the rotation center of the first pulley and the first position at which the load applying section applies a load to the first tension applying section, and the second rotation shaft is positioned between the rotation center of the second pulley and the second position at which the load applying section applies a load to the second tension applying section, the degree of freedom of the arrangement of the load applying section is improved.

By adjusting a so-called lever ratio, the degree of freedom in selecting a spring constant is also improved when a spring is used as the load applying section.

A tenth aspect is an aspect according to the first aspect, and the first tension applying section is a rotation shaft of the first pulley and the second tension applying section is a rotation shaft of the second pulley.

According to the present aspect, since the first tension applying section is the rotation shaft of the first pulley and the second tension applying section is the rotation shaft of the second pulley, it is possible to reduce the number of components.

The present aspect is not limited to the first aspect and may be according to any one of the first to ninth aspects.

An eleventh aspect is an aspect according to the first aspect, and the first pulley is provided on a shaft of the first drive source and the second pulley is provided on a shaft of the second drive source.

According to the present aspect, since the first pulley is provided on the shaft of the first drive source and the second pulley is provided on the shaft of the second drive source, it is possible to reduce the number of components.

The present aspect is not limited to the first aspect and may be according to any one of the first to ninth aspects.

A twelfth aspect is an aspect according to the first aspect, and the power transmission device further includes a fixing unit for fixing the first tension applying section and the second tension applying section.

According to the present aspect, since the fixing unit for fixing the first tension applying section and the second tension applying section is further provided, it is possible to maintain tension of the first power transmission belt and tension of the second power transmission belt in an appropriate state.

The present aspect is not limited to the first aspect and may be according to any one of the first to eleventh aspects.

A medium transport device according to a thirteenth aspect includes the power transmission device according to any one of the first to tenth aspects; the first drive source; the second drive source; and a transport section that transports a medium by power transmitted via the object to be driven.

According to the present aspect, the medium transport device can obtain the operation and effect of any one of the first to twelfth aspects described above.

A fourteenth aspect is an aspect according to the thirteenth aspect, and a registration roller pair that corrects skew of a medium is provided downstream of the transport section in a transport path of a medium.

When a medium is abutted against the registration roller by the transport section, the drive torque of the transport section is important. According to the present aspect, since power is transmitted to the transport section via the object to be driven, it is possible to obtain an appropriate torque as the drive torque of the transport section, and thus it is possible to appropriately correct skew of the medium.

A recording device according to a fifteenth aspect includes the medium transport device according to the thirteenth aspect and a recording section that performs recording on a medium transported by the medium transport device.

According to the present aspect, the recording device can obtain the operation and effect of the thirteenth aspect described above.

The present aspect is not limited to the thirteenth aspect and may include the medium transport device according to the fourteenth aspect.

The present disclosure will be described in detail below.

Hereinafter, an inkjet printer 1 that performs recording by ejecting ink, which is an example of liquid, onto a medium represented by a recording sheet, will be described as an example of a recording device. Hereinafter, the inkjet printer 1 will be referred to simply as a printer 1.

The recording device is not limited to the inkjet printer. Examples of the recording device include various printers such as a laser printer, a dot impact printer, and a thermal printer.

An X-Y-Z coordinate system shown in each drawing is an orthogonal coordinate system, and a Y-axis direction is a medium width direction intersecting a transport direction of a medium and is a device depth direction. In the present embodiment, among side surfaces constituting the periphery of a housing 2, a side surface in a +Y direction is a rear surface, and a side surface in a −Y direction is a front surface.

An X-axis direction is a device width direction and, as viewed from an operator of the printer 1, a +X direction is to a left side and a −X direction is to a right side. The −X direction is a medium feeding direction from each medium cassette (to be described later).

A Z-axis direction is a vertical direction, that is, a device height direction, a +Z direction is an upper direction, and a −Z direction is a lower direction.

Hereinafter, a direction in which a medium is transported may be referred to as "downstream", and an opposite direction of it may be referred to as "upstream". In FIG. 1, a transport path of a medium is indicated by broken line. In the printer 1, a medium is transported through a transport path indicated by broken line. In FIG. 1, reference symbols T1, T2, T3, T4, T5, and T6 denote transport paths. Each of the transport paths will be described later.

The printer 1 can also be referred to as a medium transport device 5 from the viewpoint of transporting a medium. In this case, the printer 1 is an example of a recording device including the medium transport device 5 and a line head 12 (to be described later).

In particular, the medium transport device 5 is a device including a power transmission device 50 (FIGS. 2 to 8) that transmits power to transport roller pairs 29 and 30 (to be described later).

The printer 1 includes a medium cassette 3 in a lower section of the housing 2 including the line head 12 (to be described later). The reference symbol P indicates a medium accommodated in the medium cassette 3. The medium cassette 3 is an example of a medium support section that supports a medium before feeding.

A pickup roller 21 that feeds an accommodated medium in the −X direction is provided for the medium cassette 3. The pickup roller 21 is an example of a feed roller that feeds a medium from the medium cassette 3 by rotating.

A feed roller pair 25 that feeds the medium sent out by the pickup roller 21 further downstream is provided for the medium cassette 3. A plurality of medium cassettes (not shown) are further provided below the medium cassette 3. A pickup roller (not shown) and a feed roller pair (not shown) are provided for each of the plurality of medium cassettes (not shown).

Note that in the following, the term "roller pair" is assumed to be configured of a drive roller driven by a power source such as a motor and a driven roller that is in contact with the drive roller and rotates in a driven manner, unless otherwise specifically described.

The reference symbol T1 indicates a transport path of a medium that is fed from the medium cassette 3 and reaches a transport roller pair 31, in other words, a feed path. The medium fed from the medium cassette 3 is fed to the transport roller pair 31 by receiving a feed force from the transport roller pairs 29 and 30. In the present embodiment, a feed path T1 is a path from the medium cassette 3 to the transport roller pair 31.

The transport roller pair 31 is an example of a registration roller pair that corrects skew of a medium. A leading edge of a medium fed to the transport roller pair 31 receives a feed force from the transport roller pairs 29 and 30 and abuts against the transport roller pair 31, whereby skew is corrected. The transport roller pairs 29 and 30 are an example of a transport section that transports the medium to the transport roller pair 31.

The medium that receives a feed force from the transport roller pair 31 are fed to a transport path T2. A line head 12, which is an example of a recording section, and a transport belt 17 are provided in the transport path T2. A position facing the line head 12 in the transport path T2 is a recording position. In the present embodiment, the transport path T2 is a linear path from the transport roller pair 31 to a transport roller pair 32.

The line head 12 includes nozzles 13, and performs recording by ejecting ink from the nozzles 13 onto the medium. In the present embodiment, a direction in which ink is ejected from the nozzles 13 is the −Z direction. The line head 12 is an ink ejection head in which a plurality of nozzles 13 ejecting ink are arranged so as to cover the entire area in the medium width direction, and is configured as an ink ejection head that can perform recording on the entire area in the medium width direction without being moved in the medium width direction. However, the ink ejection head is not limited to this, and may be of a type that is mounted on a carriage and that ejects ink while moving in the medium width direction.

The line head 12 according to the present embodiment ejects a plurality of colors of ink, for example. Specifically, in the present embodiment, the plurality of nozzles 13 are configured by a plurality of nozzles 13 that eject yellow ink, a plurality of nozzles 13 that eject magenta ink, a plurality of nozzles 13 that eject cyan ink, and a plurality of nozzles 13 that eject black ink.

The transport belt 17 is an endless belt wound around a first roller 18 that is a drive roller and a second roller 19 that is a driven roller, and is rotated when the first roller 18 is driven by a motor (not shown). A medium is transported to a position facing the line head 12 while being attracted to a belt surface of the transport belt 17.

The first roller 18, the second roller 19, and the transport belt 17 constitute a belt unit 16.

The medium on which recording is performed by the line head 12 is sent toward any one of a transport roller pair 33 and a transport roller pair 39 by the transport roller pair 32 positioned on a downstream side of the belt unit 16. A switching section (not shown) for switching a transport path is provided downstream of the transport roller pair 32.

The medium includes a first surface and a second surface opposite to the first surface, and when recording is performed on the first surface first, the medium is sent to a discharge path T6 when the medium is discharged without recording on the second surface or when the medium is discharged after recording on the second surface. In the present embodiment, the discharge path T6 is a path from the transport roller pair 32 to a transport roller pair 44 via transport roller pairs 39, 40, 41, 42, and 43. The discharge path T6 has a shape that curves and inverts the medium with a surface on which recording has been performed most recently facing inward.

The medium sent to the discharge path T6 are discharged face-down toward a discharge tray 8 by the transport roller pair 44. A transport path may further branch off at the discharge path T6. For example, in addition to the path for discharging the medium in a face-down manner as shown, a path for discharging the medium in a face-up manner to a discharge tray (not shown) or another device may be provided.

When recording is performed on the second surface of the medium, that is, when double-sided recording is performed, the medium is sent to a guide path T3. In the present embodiment, the guide path T3 is a path from the transport roller pair 32 to a transport roller pair 33.

The medium is further sent to a switchback path T4 by the transport roller pair 33. In the present embodiment, the switchback path T4 is a path in the +X direction from the transport roller pair 33. The switchback path T4 has a shape that curves and inverts the medium with a surface on which recording has been performed most recently facing inward. The switchback path T4 is a path for switching back the medium in order to invert the front and back of the medium on which recording has been performed by the line head 12. In addition to the transport roller pair 33, a transport roller pair 34 is further provided in the switchback path T4.

When the medium enters the switchback path T4, the rotation direction of the transport roller pairs 33 and 34 is switched, and the medium is sent in the −X direction and enters an inversion path T5.

In the present embodiment, the inversion path T5 is a path from the transport roller pair 33 to the transport roller pair 31 via transport roller pairs 35, 36, 37, and 38. The inversion path T5 passes above the line head 12 and has a shape that curves and inverts the medium with a surface on which recording has been performed most recently facing outward. The inversion path T5 is a path for inverting a medium switched back in the switchback path T4 and re-transporting the medium to the feed path T1.

The medium sent to the inversion path T5 enter the feed path T1 upstream of the transport roller pair 31, and recording is performed by the line head 12.

The reference symbol 10 denotes an ink container as a liquid container for containing ink before ejection. Ink ejected from the line head 12 is supplied from the ink container 10 to the line head 12 via a tube (not shown). The ink container 10 contains, for example, black, yellow, magenta, and cyan ink.

Figure 2:
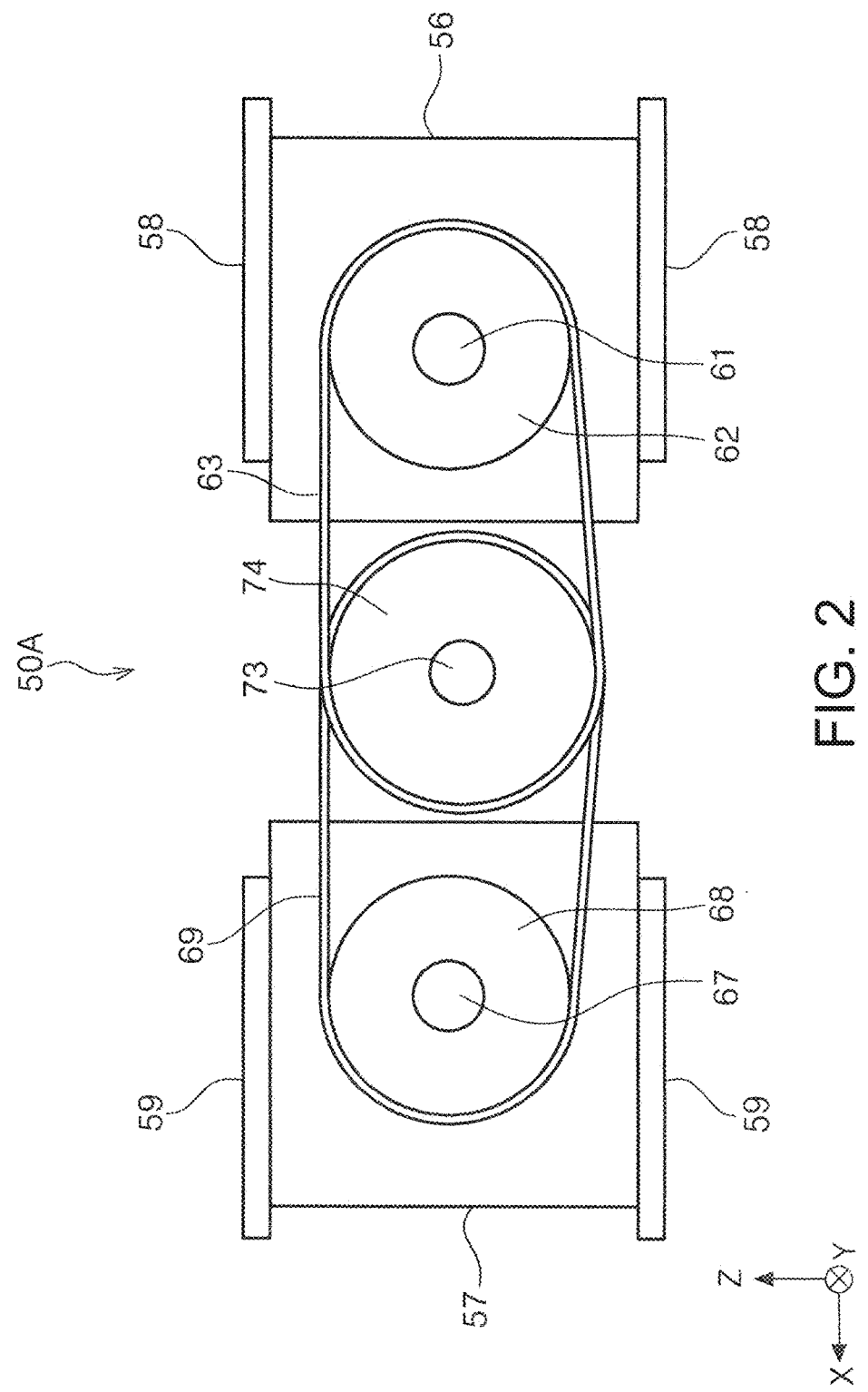
FIG. 2 is a front view of a power transmission device.

The above is the overall configuration of the printer 1, and the power transmission device 50 will be described in detail below with reference to FIG. 2 and the subsequent drawings. Note that the power transmission device 50 has a plurality of embodiments, and in FIGS. 2 to 8, embodiments of the power transmission device are distinguished by adding capital letters to the reference symbol 50. When the embodiments are not distinguished from each other, they are collectively referred to as the power transmission device 50. The same reference symbols are given to the same components in the respective embodiments, and the overlapping description will be avoided.

The power transmission device 50 is a device that transmits power to the transport roller pairs 29 and 30 via a driven pulley 74 that is an example of an object to be driven. Note that a power transmission path for transmitting power from a driven shaft 73, which is a rotation shaft of the driven pulley 74, to the transport roller pairs 29 and 30 is not shown in the drawings and will not be described.

Figure 3:
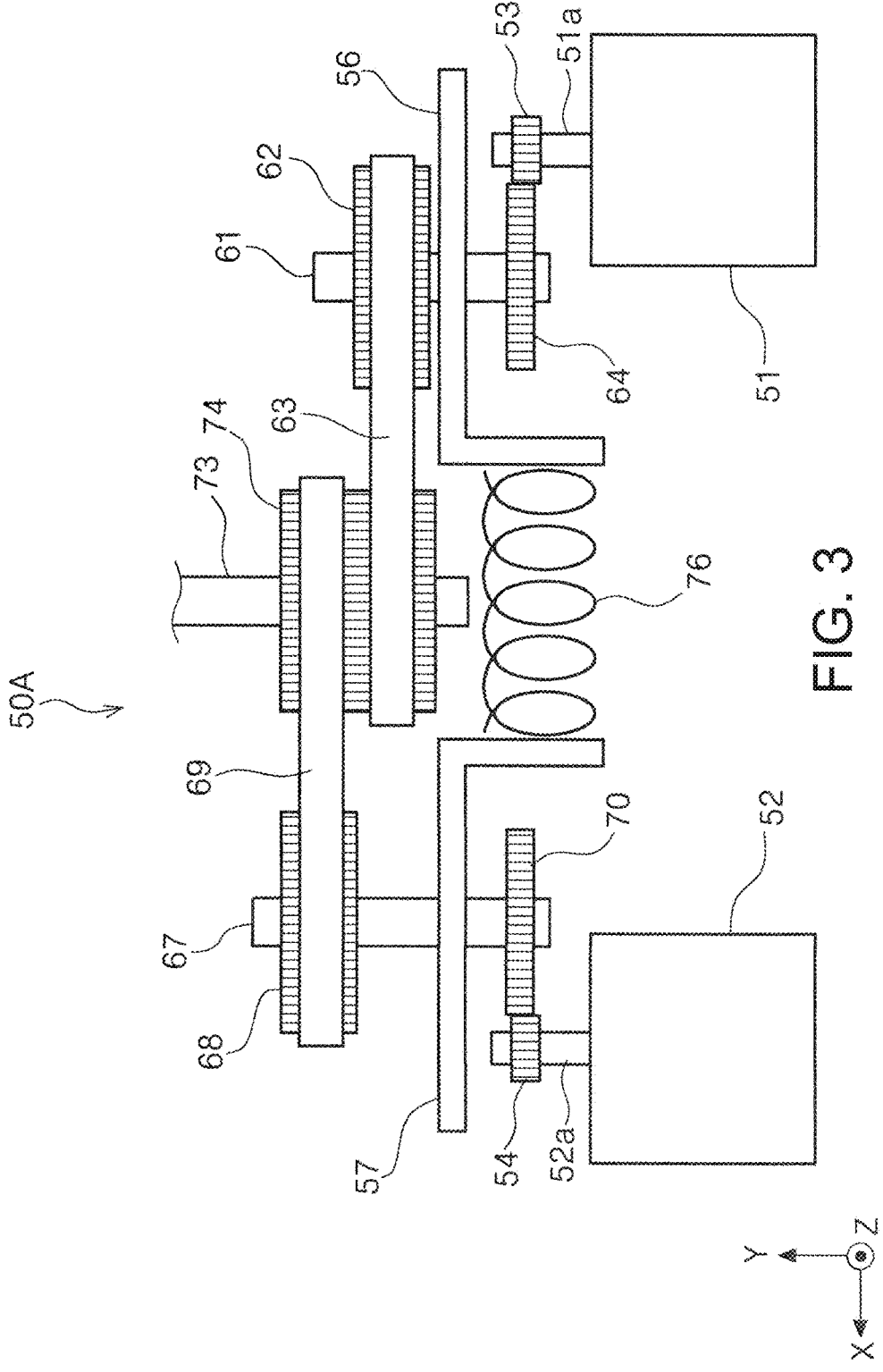
FIG. 3 is a plan view of the power transmission device.

A power transmission device 50A according to a first embodiment will be described with reference to FIGS. 2 and 3.

The power transmission device 50A includes the driven pulley 74. The driven pulley 74 is provided on the driven shaft 73.

The power transmission device 50A includes a first pulley 62 and a second pulley 68. The first pulley 62 is driven by a first motor 51 as a first drive source. The second pulley 68 is driven by a second motor 52 as a second drive source. The first pulley 62 is provided on a first pulley shaft 61, and the second pulley 68 is provided on a second pulley shaft 67.

A first power transmission belt 63 is wound around the first pulley 62 and the driven pulley 74. The first power transmission belt 63 transmits power from the first pulley 62 to the driven pulley 74.

A second power transmission belt 69 is wound around the second pulley 68 and the driven pulley 74. The second power transmission belt 69 transmits power from the second pulley 68 to the driven pulley 74.

The first pulley shaft 61 is rotatably supported by a first frame 56. In the present embodiment, the first frame 56 is provided so as to be displaceable along the X-axis direction by being guided by guides 58 and 58. When the first frame 56 is displaced in the −X direction, tension of the first power transmission belt 63 increases. The first frame 56 is an example of a first tension applying section that applies tension to the first power transmission belt 63.

The second pulley shaft 67 is rotatably supported by a second frame 57. In the present embodiment, the second frame 57 is provided so as to be displaceable along the X-axis direction by being guided by guides 59 and 59. When the second frame 57 is displaced in the +X direction, tension of the second power transmission belt 69 increases. The second frame 57 is an example of a second tension applying section that applies tension to the second power transmission belt 69.

In the present embodiment, the first pulley shaft 61 and the second pulley shaft 67 have the same outer diameter. The first pulley 62 and the second pulley 68 have the same outer diameter. Therefore, the same pulley can be used as the first pulley 62 and the second pulley 68. The first power transmission belt 63 and the second power transmission belt 69 are endless belts and have the same belt length. Therefore, the first power transmission belt 63 and the second power transmission belt 69 can use the same belt as a component.

The first pulley shaft 61 is provided with a gear 64. A pinion 53 provided on a drive shaft 51a of the first motor 51 meshes with the gear 64, thereby transmitting power from the first motor 51 to the first pulley 62.

The second pulley shaft 67 is provided with a gear 70. A pinion 54 provided on a drive shaft 52a of the second motor 52 meshes with the gear 70, thereby transmitting power from the second motor 52 to the second pulley 68.

A compression coil spring 76, which is an example of a load applying section that applies a load to the first frame 56 and applies a load to the second frame 57, is provided between the first frame 56 and the second frame 57. The compression coil spring 76 is held by a frame (not shown).

The compression coil spring 76 presses the first frame 56 in the −X direction and presses the second frame 57 in the +X direction.

As described above, the power transmission device 50 is configured to apply a load to both the first frame 56 and the second frame 57 by the single compression coil spring 76, and thus a load applied to the first frame 56 and a load applied to the second frame 57 are equal to each other in most cases, or even when the difference occurs, a difference therebetween is small. As a result, the difference between tension of the first power transmission belt 63 and tension of the second power transmission belt 69 can be suppressed. For example, the difference between tension of the first power transmission belt 63 and tension of the second power transmission belt 69 can be almost eliminated.

If the difference between tension of the first power transmission belt 63 and tension of the second power transmission belt 69 increases, a load is concentrated on a motor on a side where tension is larger, and there is a possibility that durability will deteriorate or an error due to an excess load will occur.

However, in the power transmission device 50, since a load is applied to both the first frame 56 and the second frame 57 by one load applying section as described above, it is possible to suppress the difference between tension of the first power transmission belt 63 and tension of the second power transmission belt 69, and to suppress a load from being concentrated on some of a plurality of motors.

In most cases, the distance between a rotation center of the first pulley 62 and an axis center of the driven shaft 73 in the X-axis direction is equal to the distance between a rotation center of the second pulley 68 and an axis center of the driven shaft 73 in the X-axis direction.

In the present embodiment and each embodiment described below, the load applying section that applies a load to the first frame 56 and the second frame 57 is a spring member that applies a load to the first frame 56 at one end and applies a load to the second frame 57 at an other end.

In the power transmission device 50A according to the present embodiment, the spring member is the compression coil spring 76. In the power transmission device 50A, the first frame 56 and the second frame 57 are displaceable along a load applying direction of the compression coil spring 76. This makes it possible to provide a configuration in which the spring force of the compression coil spring 76 easily acts on the first frame 56 and the second frame 57.

Figure 4:
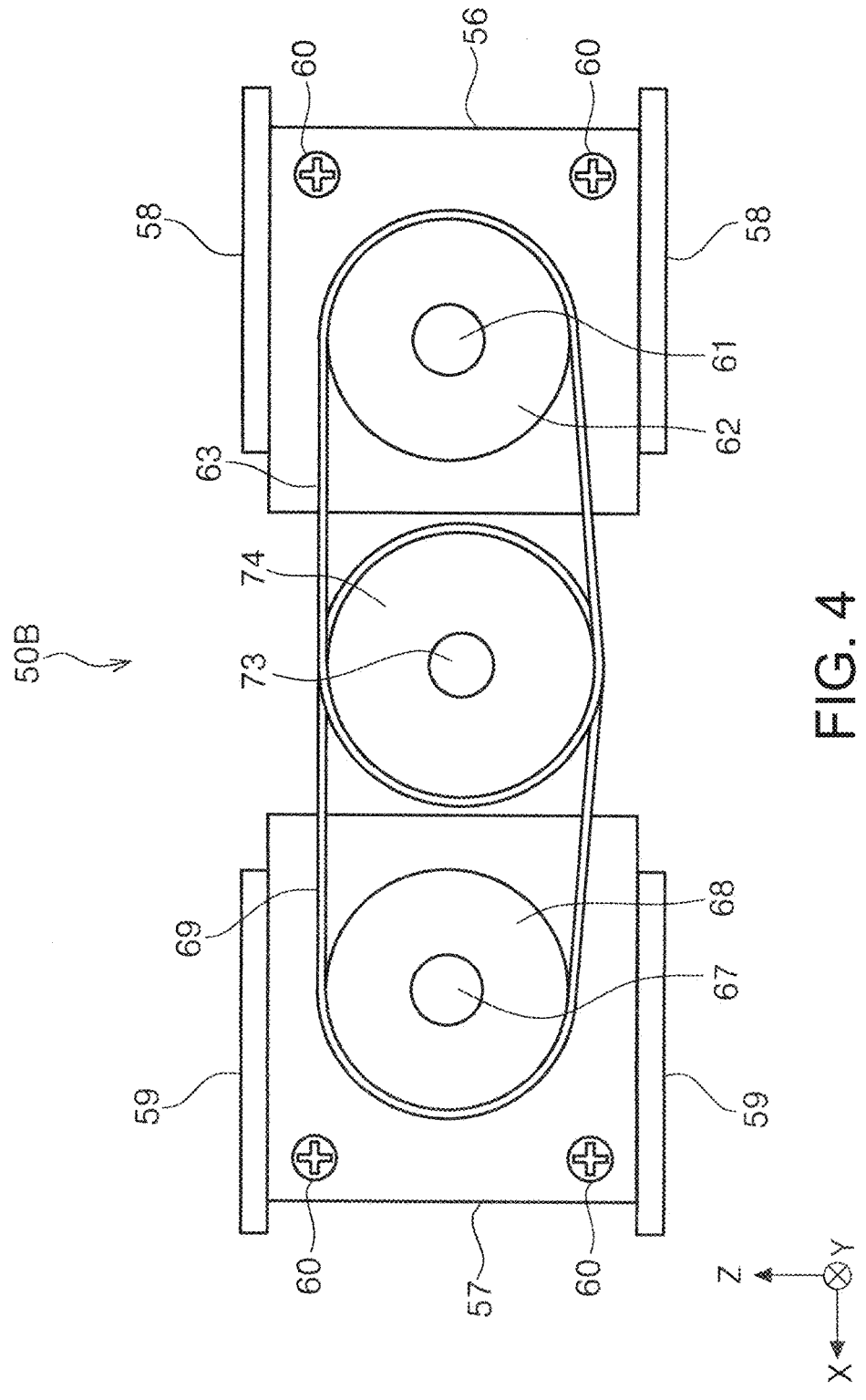
FIG. 4 is a front view of the power transmission device.

Next, FIG. 4 shows a power transmission device 50B according to a second embodiment. The power transmission device 50B is different from the power transmission device 50A described above in that the first frame 56 and the second frame 57 can be fixed to a frame (not shown) by fixing screws 60 that are an example of a fixing unit. For example, if the fixing screw 60 is fastened in a state where the first motor 51 and the second motor 52 are stopped and positions of the first frame 56 and the second frame 57 in the X-axis direction are determined, tension of the first power transmission belt 63 and tension of the second power transmission belt 69 can be maintained in an appropriate state. As a result, compared to a case where the first frame 56 and the second frame 57 are not fixed, minute vibrations are less likely to occur in the first frame 56 and the second frame 57 during operation of the motors, and fluctuations are less likely to occur in tension of the first power transmission belt 63 and tension of the second power transmission belt 69, so the driven shaft 73 can be stably driven and drive control is facilitated.

Figure 5:
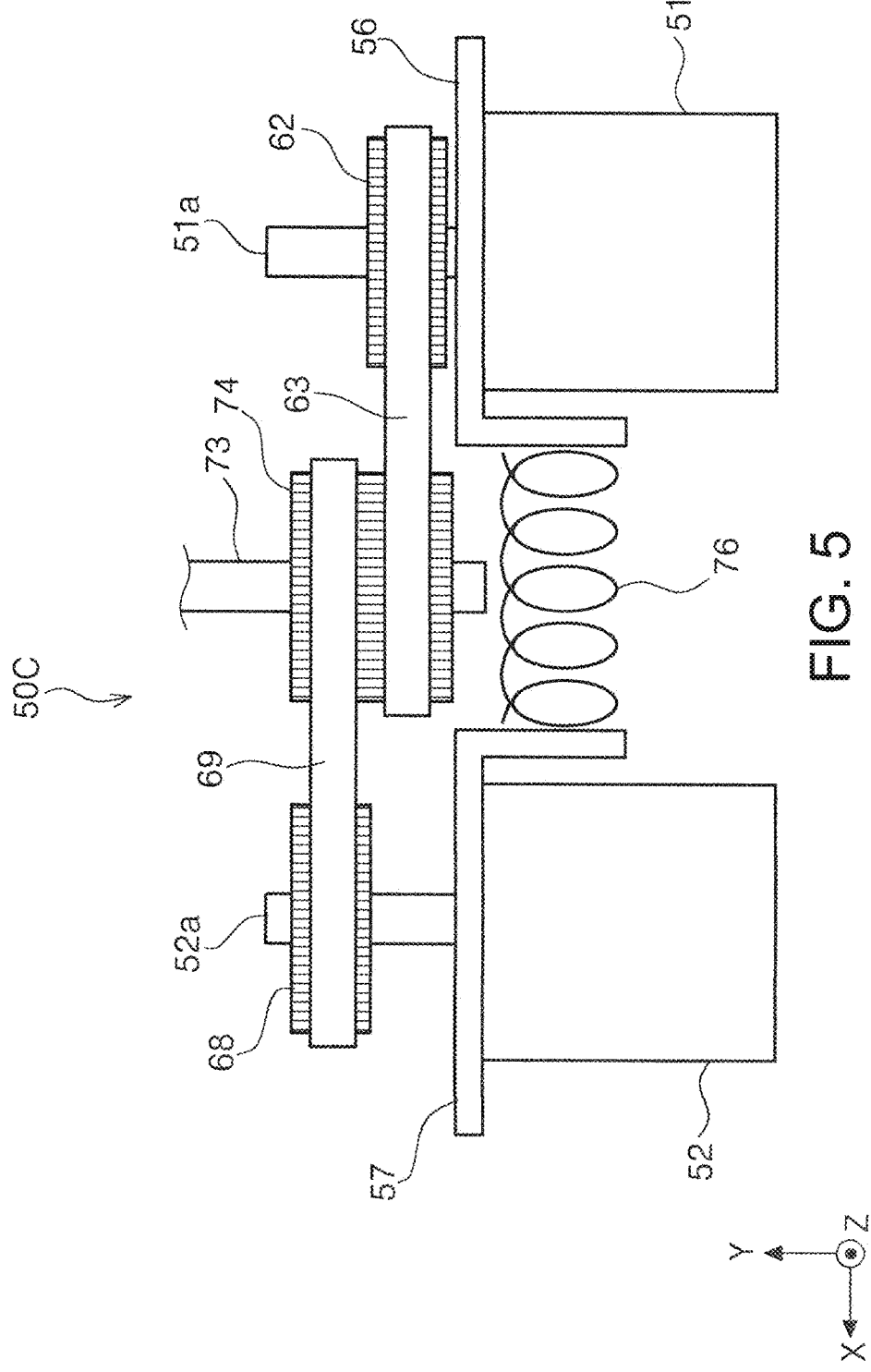
FIG. 5 is a plan view of the power transmission device.

Next, FIG. 5 shows a power transmission device 50C according to a third embodiment. The power transmission device 50C is different from the power transmission devices 50A and 50B described above in that the first pulley 62 is directly provided on the drive shaft 51a of the first motor 51 and the second pulley 68 is directly provided on the drive shaft 52a of the second motor 52. The first motor 51 is fixed to the first frame 56, and the second motor 52 is fixed to the second frame 57.

According to such a configuration, the first pulley shaft 61 and the second pulley shaft 67 of the above-described power transmission devices 50A and 50B are not necessary, and the number of components can be reduced.

According to such a configuration, the pinions 53 and 54 and the gears 64 and 70 of the above-described power transmission devices 50A and 50B are also unnecessary, and the number of components can be reduced.

Figure 6:
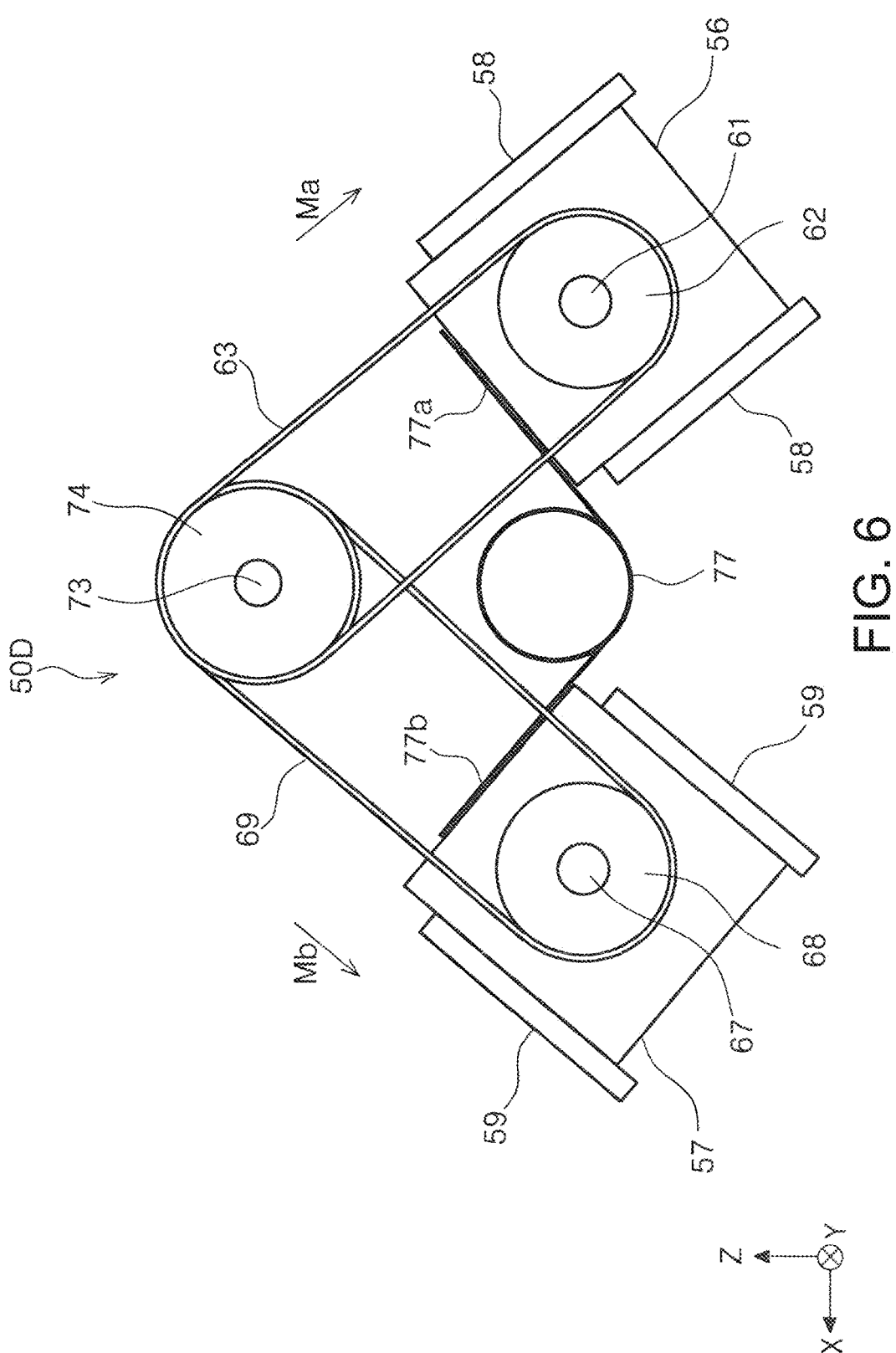
FIG. 6 is a front view of the power transmission device.

Next, FIG. 6 shows a power transmission device 50D according to a fourth embodiment. In the power transmission device 50D, the spring member that applies a load to the first frame 56 and the second frame 57 is a torsion spring 77. The torsion spring 77 is held by a frame (not shown). The torsion spring 77 includes a first arm section 77a that applies a load to the first frame 56 and a second arm section 77b that applies a load to the second frame 57.

In the present embodiment, the first frame 56 is displaceable in a direction intersecting the X-axis direction and the Z-axis direction by being guided by the guides 58 and 58. The second frame 57 is displaceable in a direction intersecting the X-axis direction and the Z-axis direction by being guided by the guides 59 and 59.

A first direction Ma, which is a direction in which the first arm section 77a applies a load to the first frame 56, has a −X direction component and a −Z direction component. A second direction Mb, which is a direction in which the second arm section 77b applies a load to the second frame 57, has a +X direction component and a −Z direction component. That is, the first direction Ma and the second direction Mb are different directions. In particular, in the present embodiment, the first direction Ma and the second direction Mb intersect each other. The first frame 56 is displaceable along the first direction Ma, and the second frame 57 is displaceable along the second direction Mb.

With such a configuration, the spring force of the torsion spring 77 can be easily applied to the first frame 56 and the second frame 57.

In addition, since the first direction Ma and the second direction Mb intersect each other, the first pulley 62 and the second pulley 68 can be brought close to each other in the X-axis direction, that is, in a direction along the inter-axis distance. As a result, the device dimension in a direction along the inter-axis distance between the first pulley 62 and the second pulley 68, that is, in the X-axis direction, can be suppressed.

In the power transmission devices 50A to 50C described above, the torsion spring 77 may be provided instead of the compression coil spring 76. In this case, the first direction Ma is along the −X direction. The second direction Mb is along the +X direction. That is, the first direction Ma and the second direction Mb are different directions. In the power transmission devices 50A to 50C, the first direction Ma and the second direction Mb are opposite directions.

Figure 7:
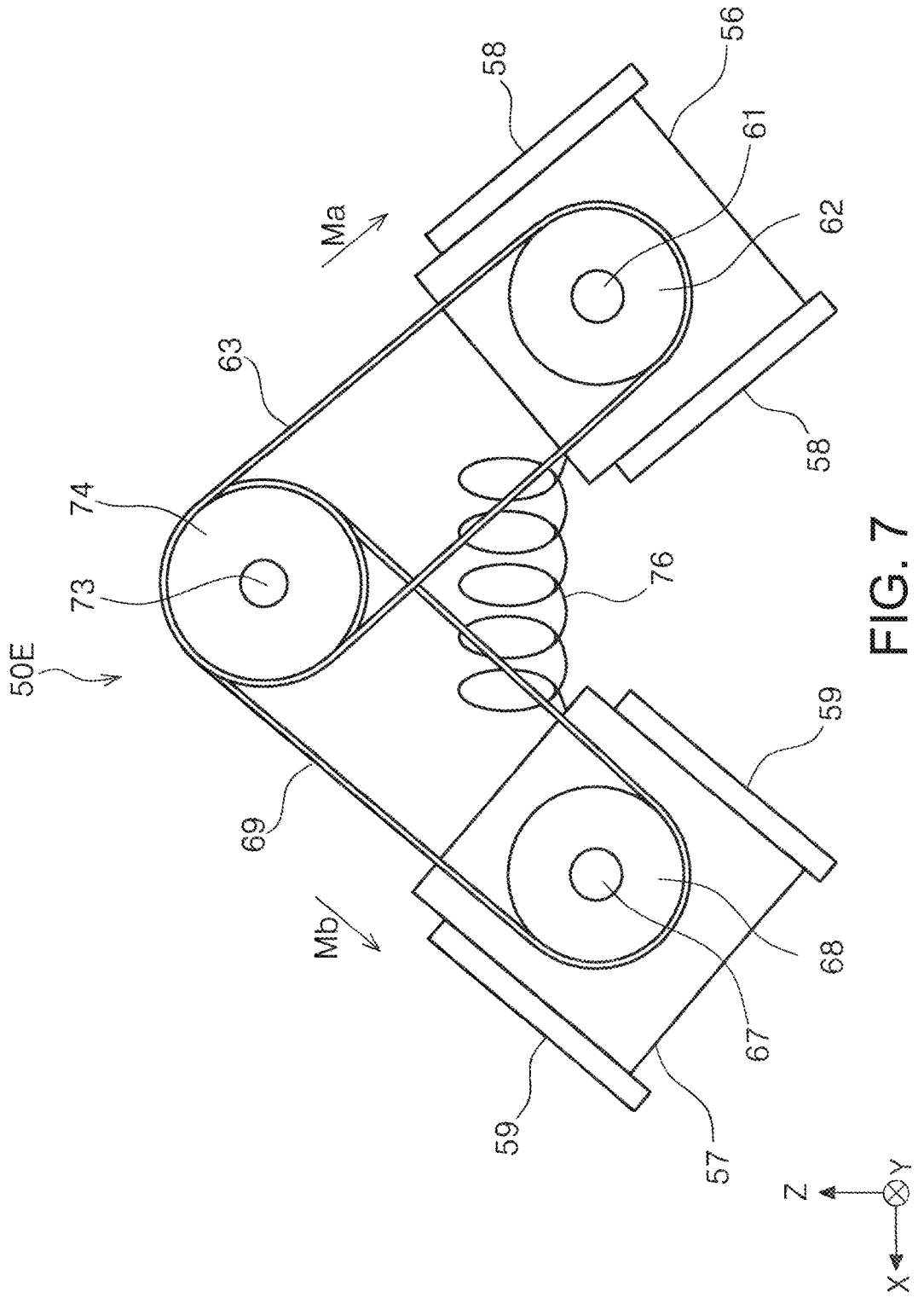
FIG. 7 is a front view of the power transmission device.

Next, FIG. 7 shows a power transmission device 50E according to a fifth embodiment. The power transmission device 50E is different from the above-described power transmission device 50D in that the spring member that applies a load to the first frame 56 and the second frame 57 is the compression coil spring 76. The compression coil spring 76 is held by a frame (not shown). The compression coil spring 76 presses the first frame 56 in the −X direction. The pressing force includes a component in the first direction Ma. The compression coil spring 76 presses the second frame 57 in the +X direction. The pressing force includes a component in the second direction Mb.

Even with such a configuration, the first direction Ma and the second direction Mb intersect each other, and thus the first pulley 62 and the second pulley 68 can be brought close to each other. As a result, the device dimension in a direction along the inter-axis distance between the first pulley 62 and the second pulley 68, that is, in the X-axis direction, can be suppressed.

In the power transmission devices 50A, 50B, 50D, and 50E described above, the first frame 56 serving as the first tension applying section that applies tension to the first power transmission belt 63 holds the first pulley shaft 61, and the second frame 57 serving as the second tension applying section that applies tension to the second power transmission belt 69 holds the second pulley shaft 67.

By this, a load of the load applying section is easily applied to the first power transmission belt 63, and a load of the load applying section is easily applied to the second power transmission belt 69.

Figure 8:
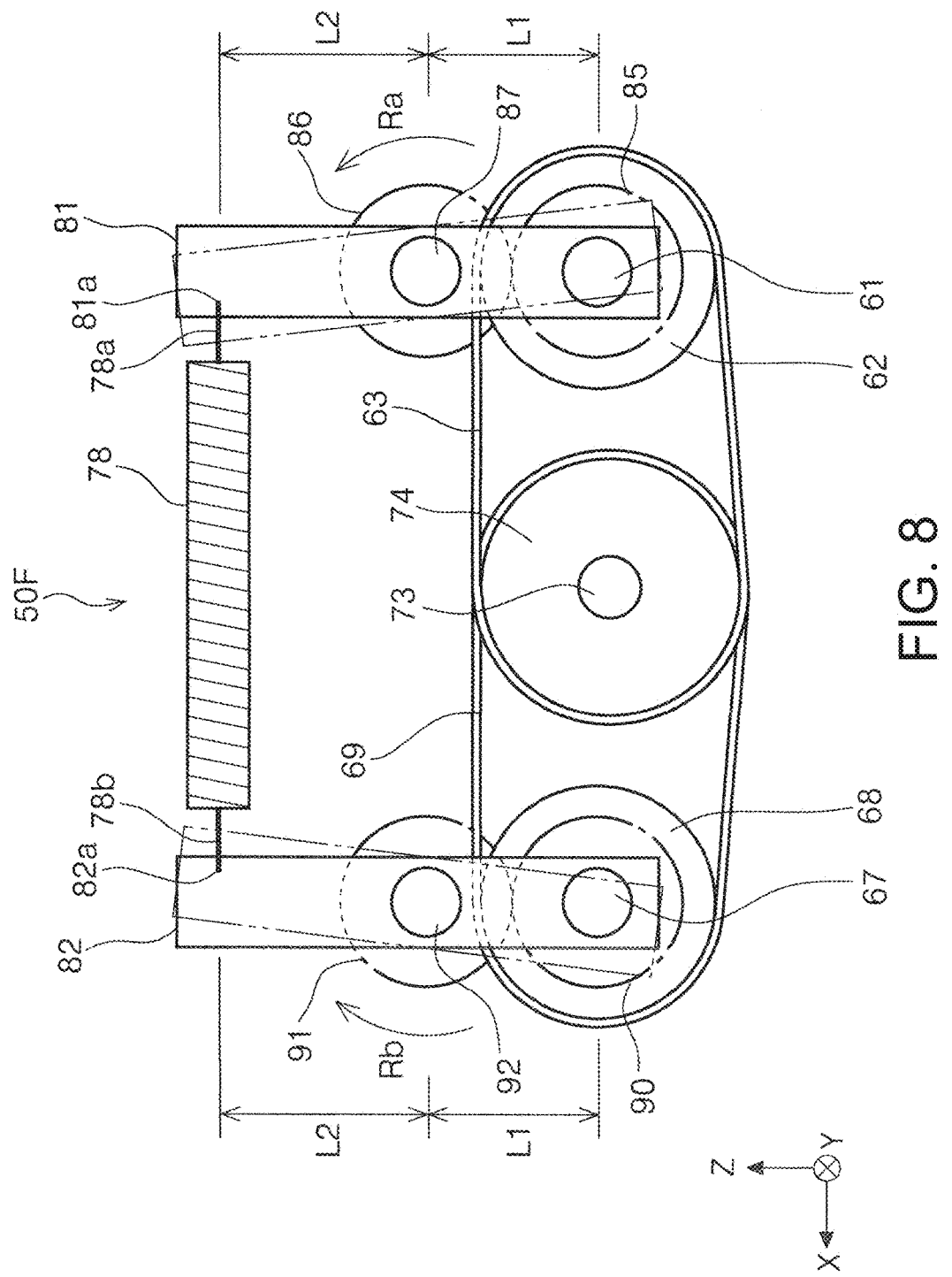
FIG. 8 is a front view of the power transmission device.

Next, FIG. 8 shows a power transmission device 50F according to a sixth embodiment. The power transmission device 50F includes a first rotation member 81 as a first tension applying section that applies a tension to the first power transmission belt 63, and a second rotation member 82 as a second tension applying section that applies tension to the second power transmission belt 69.

The first rotation member 81 holds the first pulley shaft 61 that is a rotation shaft of the first pulley 62. The second rotation member 82 holds the second pulley shaft 67 that is a rotation shaft of the second pulley 68. This makes it easier for a load of a tension coil spring 78 (to be described later) to be applied to the first power transmission belt 63, and makes it easier for a load of the tension coil spring 78 to be applied to the second power transmission belt 69.

The first rotation member 81 includes a first gear 86 that transmits power to the first pulley 62, and is swingable around a first rotation shaft 87 that is a rotation shaft of the first gear 86. A first pulley gear 85 is integrally provided on the first pulley 62, and the first pulley gear 85 meshes with the first gear 86, whereby the first gear 86 transmits power to the first pulley 62. Although not shown, power of the first motor 51 is transmitted to the first gear 86 via a gear (not shown), and the first gear 86 rotates.

In FIG. 8, the gear is shown in a simplified manner by drawing the reference circle with the single dot chain line.

The second rotation member 82 includes a second gear 91 that transmits power to the second pulley 68, and is swingable around a second rotation shaft 92 that is a rotation shaft of the second gear 91. A second pulley gear 90 is integrally provided on the second pulley 68, and the second pulley gear 90 meshes with the second gear 91, whereby the second gear 91 transmits power to the second pulley 68. Although not shown, power of the second motor 52 is transmitted to the second gear 91 via a gear (not shown), and the second gear 91 rotates.

One end 78a of the tension coil spring 78 is hooked on the first rotation member 81 to apply a load to the first rotation member 81. The first rotation shaft 87 is positioned between a rotation center of the first pulley 62, that is, the first pulley shaft 61, and a first position 81a at which the tension coil spring 78 applies a load to the first rotation member 81. With such a configuration, a force for swinging in a swing direction Ra is applied to the first rotation member 81 by the spring force of the tension coil spring 78.

An other end 78b of the tension coil spring 78 is hooked on the second rotation member 82 to apply a load to the second rotation member 82. The second rotation shaft 92 is positioned between a rotation center of the second pulley 68, that is, the second pulley shaft 67, and a second position 82a at which the tension coil spring 78 applies a load to the second rotation member 82. With such a configuration, a force for swinging in a swing direction Rb is applied to the second rotation member 82 by the spring force of the tension coil spring 78.

When the first rotation member 81 is pressed in the swing direction Ra by the spring force of the tension coil spring 78 and the first rotation member 81 changes from the posture of the solid line to the posture of the double dot chain line, for example, tension of the first power transmission belt 63 increases. When the second rotation member 82 is pressed in the swing direction Rb by the spring force of the tension coil spring 78 and the second rotation member 82 changes from the posture of the solid line to the posture of the double dot chain line, for example, tension of the second power transmission belt 69 increases.

A distance L1 is a distance between the rotation center of the first pulley 62 and an axis center of the first rotation shaft 87, and is also the distance between the rotation center of the second pulley 68 and an axis center of the second rotation shaft 92. A distance L2 is a distance between the first position 81a at which the tension coil spring 78 applies a load to the first rotation member 81 and the axis center of the first rotation shaft 87, and is also a distance between the second position 82a at which the tension coil spring 78 applies a load to the second rotation member 82 and the axis center of the second rotation shaft 92.

In the present embodiment, the distance L1 is shorter than the distance L2. However, the distance L1 may be equal to the distance L2, or the distance L1 may be longer than distance L2.

The power transmission device 50F including the above-described configuration improves the degree of freedom of arrangement of the tension coil spring 78, which is an example of the load applying section.

In contrast to the power transmission device 50 shown in FIG. 5, it is possible to avoid side pressure from being applied to the drive shaft 51a of the first motor 51 and the drive shaft 52a of the second motor 52.

Since the lever ratio is defined by the distance L1 and the distance L2, the degree of freedom of selection of the spring constant is improved by setting the distance L1 and distance L2.

In the present embodiment, since the distance L1 is shorter than the distance L2, the tension coil spring 78 having a small spring constant can be used. That is, when the lever ratio is L1/L2, if the lever ratio is less than 1, tension can be applied to the first power transmission belt 63 and the second power transmission belt 69 with a small force.

As described above, the medium transport device 5 includes the power transmission device 50, the first motor 51, the second motor 52, and the transport roller pairs 29 and 30 that are transport sections that transport a medium by power being transmitted via the driven pulley 74.

The transport roller pair 31 that is a registration roller pair for correcting skew of a medium is provided downstream of the transport roller pairs 29 and 30.

In a case where a medium is abutted against the transport roller pair 31 by the transport roller pairs 29 and 30 and skew is corrected, the drive torque of the transport roller pairs 29 and 30 is important. According to the present embodiment, since power is transmitted to the transport roller pairs 29 and 30 via the driven pulley 74, it is possible to obtain an appropriate torque as the drive torque of the transport roller pairs 29 and 30, and thus it is possible to appropriately correct skew of a medium.

In the embodiment described above, the first frame 56 or the first rotation member 81 is used as the first tension applying section that applies tension to the first power transmission belt 63, but the first tension applying section may be a rotation shaft of the first pulley 62, that is, the first pulley shaft 61. That is, a load of the load applying section may be directly applied to the first pulley shaft 61.

Similarly, in the embodiment described above, the second frame 57 or the second rotation member 82 is used as the second tension applying section that applies tension to the second power transmission belt 69, but the second tension applying section may be a rotation shaft of the second pulley 68, that is, the second pulley shaft 67. That is, a load of the load applying section may be directly applied to the second pulley shaft 67.

With this configuration, the number of components can be reduced.

The present disclosure is not limited to the embodiments and the modifications described above, and various modifications can be made within the scope of the disclosure described in the claims, and it is needless to say that these are also included in the scope of the present disclosure.

What is claimed is:

1. A power transmission device comprising:
a first pulley driven by a first drive source;
a second pulley driven by a second drive source;
a first power transmission belt that is wound around the first pulley and an object to be driven and that transmits power from the first pulley to the object to be driven;
a second power transmission belt that is wound around the second pulley and the object to be driven and that transmits power from the second pulley to the object to be driven;
a first tension applying section that applies tension to the first power transmission belt;
a second tension applying section that applies tension to the second power transmission belt; and
a load applying section that applies a load to the first tension applying section and applies a load to the second tension applying section.

2. The power transmission device according to claim 1, wherein
the load applying section is a spring member including one end that applies a load to the first tension applying section and an other end that applies a load to the second tension applying section.

3. The power transmission device according to claim 2, wherein
the spring member is a coil spring and
the first tension applying section and the second tension applying section are configured to be displaced along a load applying direction of the coil spring.

4. The power transmission device according to claim 2, wherein
the spring member is a torsion spring including a first arm section that applies a load to the first tension applying section and a second arm section that applies a load to the second tension applying section,
a first direction in which the first arm section applies a load to the first tension applying section is different from a second direction in which the second arm section applies a load to the second tension applying section,
the first tension applying section is configured to be displaced along the first direction, and
the second tension applying section is configured to be displaced along the second direction.

5. The power transmission device according to claim 3, wherein
a first direction in which the one end applies a load to the first tension applying section and a second direction in which the other end applies a load to the second tension applying section intersect with each other.

6. The power transmission device according to claim 4, wherein
the first direction and the second direction intersect with each other.

7. The power transmission device according to claim 1, wherein
the first tension applying section holds a rotation shaft of the first pulley.

8. The power transmission device according to claim 7, wherein
the second tension applying section holds a rotation shaft of the second pulley.

9. The power transmission device according to claim 8, wherein
the first tension applying section includes a first gear that transmits power to the first pulley and the first tension applying section is configured to swing around a first rotation shaft that is a rotation shaft of the first gear,
the second tension applying section includes a second gear that transmits power to the second pulley and the second tension applying section is configured to swing around a second rotation shaft that is a rotation shaft of the second gear,
the first rotation shaft is positioned between a rotation center of the first pulley and a first position at which the load applying section applies a load to the first tension applying section, and
the second rotation shaft is positioned between a rotation center of the second pulley and a second position at which the load applying section applies a load to the second tension applying section.

10. The power transmission device according to claim 1, wherein
the first tension applying section is a rotation shaft of the first pulley and
the second tension applying section is a rotation shaft of the second pulley.

11. The power transmission device according to claim 1, wherein
the first pulley is provided on a shaft of the first drive source and
the second pulley is provided on a shaft of the second drive source.

12. The power transmission device according to claim 1, further comprising:
a fixing unit for fixing the first tension applying section and the second tension applying section.

13. A medium transport device comprising:
the power transmission device according to claim 1;
the first drive source;
the second drive source; and
a transport section that transports a medium by power transmitted via the object to be driven.

14. The medium transport device according to claim 13, wherein a registration roller pair that corrects skew of a medium is provided downstream of the transport section in a transport path of a medium.

15. A recording device comprising:

the medium transport device according to claim 13 and a recording section that performs recording on a medium transported by the medium transport device.

* * * * *